US005586618A

United States Patent [19]
Francis

[11] Patent Number: 5,586,618
[45] Date of Patent: Dec. 24, 1996

[54] SYSTEM FOR LUBRICATING THREADED MEMBERS

[76] Inventor: Dale Francis, 379 Fairfield Ave., Gretna, La. 70056

[21] Appl. No.: 557,501

[22] Filed: Nov. 14, 1995

[51] Int. Cl.$^6$ .............................. F16N 19/00; F16N 7/19
[52] U.S. Cl. ......................... 184/14; 118/244; 118/258; 118/263; 118/266; 118/429
[58] Field of Search .................................. 184/11.1, 13.1, 184/14; 15/88, 104.04; 118/244, 258, 263, 264, 266, 429; 401/218; 427/429

[56] References Cited

U.S. PATENT DOCUMENTS

| | | | |
|---|---|---|---|
| 1,610,518 | 12/1926 | Hensey, Sr. | 184/14 |
| 2,276,486 | 3/1942 | Harshberger | 118/258 |
| 5,159,734 | 11/1992 | Whitt et al. | 15/88 |
| 5,520,737 | 5/1996 | Denton | 118/429 |

FOREIGN PATENT DOCUMENTS 0686785  10/1979  U.S.S.R. .................... 15/88

*Primary Examiner*—F. Daniel Lopez
*Assistant Examiner*—Christopher Verdier
*Attorney, Agent, or Firm*—Pravel, Hewitt, Kimball & Krieger

[57] ABSTRACT

An apparatus for applying a thin coat of lubricant evenly on a threaded portion of a bolt stud, which includes a chamber for housing a quantity of lubricant to be applied onto the threads of the bolt stud, a first roller for receiving lubricant onto the outer surface of the roller as the roller rotates; a first bristled brush, the ends of the bristles of the brush making sufficient contact with the outer surface of the roller in order to transfer a quantity of the lubricant from the surface of the roller onto the ends of the bristles of the brush as the roller and the brush are rotated; a motor for rotating the roller and the brush; an orifice bored in the wall of the apparatus for inserting the end of the stud of a bolt into, the orifice positioned so as the stud is placed into the orifice, the ends of the bristles of the brush make sufficient contact with the threaded end portion of the stud to transfer grease or lubricant from the ends of the bristles in a thin, even layer onto that portion of the threaded stud.

17 Claims, 3 Drawing Sheets 5,586,618

SYSTEM FOR LUBRICATING THREADED MEMBERS

BACKGROUND OF THE INVENTION

1. Field Of The Invention

The system of the present invention relates to lubrication systems. More particularly, the present invention relates to a system for lubricating a portion of the threaded stud portion in large construction bolts in order to apply a thin even coat of lubrication onto a threaded portion of the bolt.

2. General Background

In various settings of the construction industry, steel components utilized in construction are usually assembled by bolting the components together. For example, in scaffolding used in construction, or on plant sites, where flanged connections are utilized, the connections are usually held together via a series of large bolts with a nut threadably engaged to the end of the bolt. When these components are disassembled, in order to service a system in the plant or to change out the components, the nuts are disengaged from the bolt, and, of course, when reassembly takes place, the nuts are rethreaded onto the bolts.

One problem confronted in this process is the fact that it is very beneficial to have a portion of the end of the stud portion of the bolt lubricated so that the nut will reengage onto the bolt quite easily and without serious effort. In the present state of the art, lubricating the end of the stud is routine practice, and is usually accomplished manually by a worker applying a layer lubricant such as a heavy grease to the end of the stud with the use of a brush or the like utensil. Several problems arise in this method of lubricating the bolts. The first is that in order to accomplish this task, in a setting where there may be thousands of bolts involved, the task of manually brushing the lubricant onto the surface of the bolt stud is very time consuming and labor intensive. Secondly, because of the fact that the lubricant is very expensive, the lubricant need only be applied as a very thin layer on a stud, and therefore the use of a brush usually results in an over-application of lubricant and therefore, a large quantity of lubricant is wasted since the nut, when threaded onto the bolt, in effect, squeezes all of the excess lubricant out of the threads and the lubricant is then lost.

Therefore, it would be very beneficial in the industry to have a system that would apply the lubricant onto the portion of the threaded stud evenly, quickly, and in a very thin layer, so as to reduce the time, effort and costs involved in applying the lubricant to the threaded portion of the stud, and yet apply a sufficient quantity of lubricant so that the nut rethreads onto the bolt quite easily after the lubrication process has taken place.

SUMMARY OF THE PRESENT INVENTION

The system of the present invention solves the aforesaid problems in the art in a simple and straight forward manner. What is provided is an apparatus for applying a thin coat of lubricant evenly on a threaded portion of a bolt stud, which includes a chamber for housing a quantity of lubricant to be applied onto the threads of the bolt stud, a first roller for receiving lubricant onto the outer surface of the roller as the roller rotates; a first bristled brush, the bristles of the brush making sufficient contact with the outer surface of the roller in order to transfer a quantity of the lubricant from the surface of the roller onto the ends of the bristles of the brush as the brush is rotated; a motor linked to the roller and the brush for rotating the roller and the brush; an orifice bored in the wall of the apparatus for inserting the end of the stud of a bolt into, the orifice positioned so that as the stud is placed into the orifice, the ends of the bristles of the brush makes sufficient contact with the threaded end portion of the stud to transfer grease or lubricant from the ends of the bristles onto that portion of the threaded stud. There may be further included a second roller and a second brush operating in unison as with the first roller and the first brush so that as the stud is inserted into the orifice, the pair of brushes make contact with the surface of the threaded stud and lubricant is applied onto the threaded stud surface through rotation of the first and second brushes. Further, there is included an adjustment screw for adjusting the opening between the first and second rollers and the lubricant chamber, so as to increase or decrease the amount of lubricant that is flowing to the surface of the rollers during operation.

It is therefore a principal object of the present invention to provide an apparatus for applying an even layer of lubricant to a threaded portion of a bolt stud, in an efficient and quick manner so as to reduce the amount of lubricant utilized and to decrease the amount of time involved in applying the lubricant;

It is a further object of the present invention to provide a system for applying lubricant to a threaded portion of a bolt stud, by transferring the lubricant from rotating rollers onto the bristles of rotating brushes which in turn make contact with the threaded portion of the bolt stud for applying lubricant thereto;

It is a further object of the present invention to provide a system for applying lubricant to the threaded portion of a bolt stud, which allows a bolt stud to be inserted into an orifice and manually rotated so that a thin even layer of lubricant can be applied evenly and quickly, and the bolt can be retrieved from the orifice and other bolts can be inserted for receiving lubricant on a continuous basis;

It is a further object of the present invention to provide a system for applying lubricant to the threaded portion of a bolt stud, which allows bolts having a stud with a diameter up to three inches, to be inserted into the apparatus for applying the lubricant onto the threaded portion of the bolt stud in an evenly applied thin layer of lubricant.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

FIGS. 1–4 illustrate the preferred embodiment of the apparatus of the present invention by the numeral 10. As illustrated in frontal view in FIG. 1, and side view in FIG.

Figure 1:
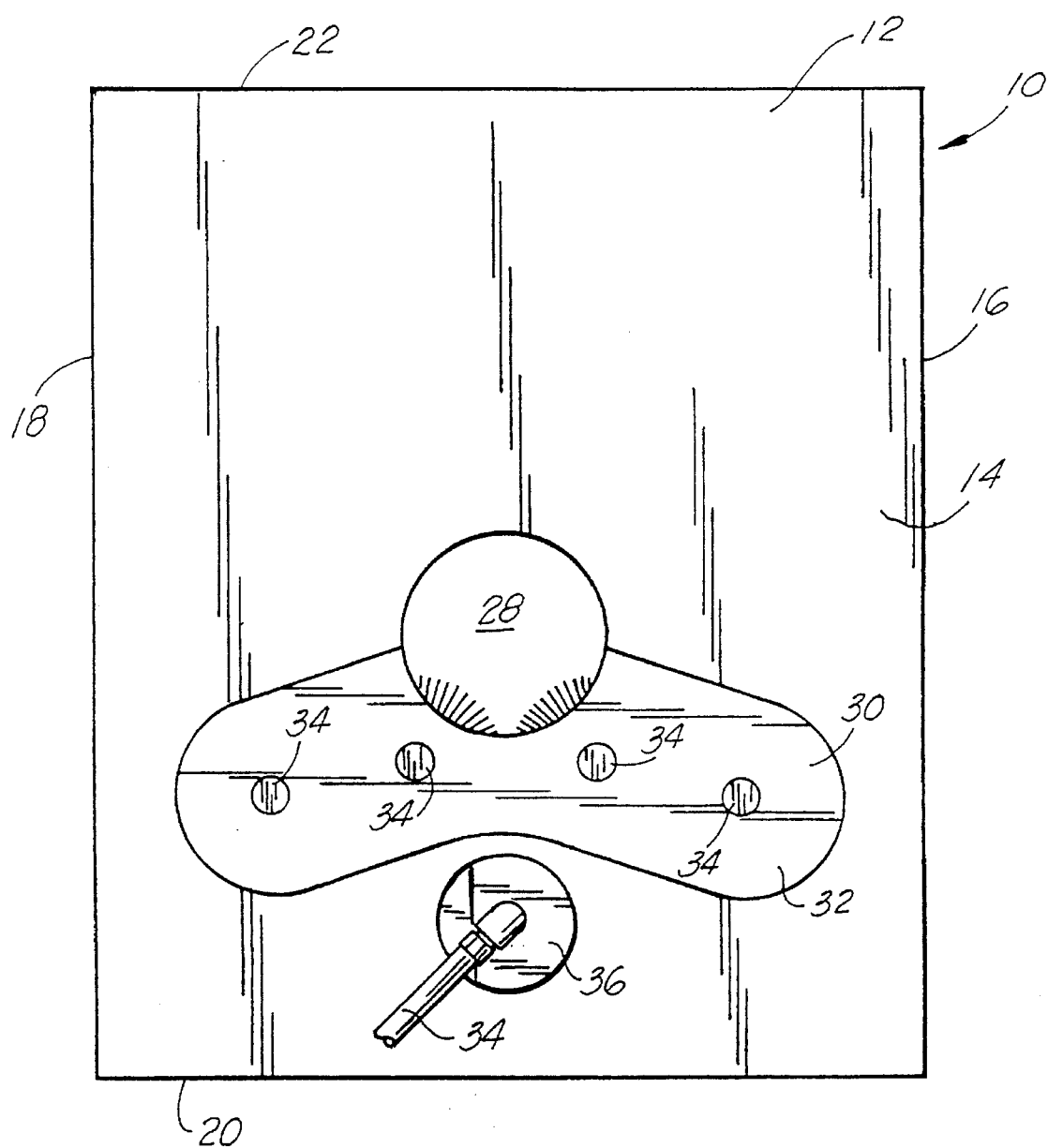
FIG. 1 is an overall front view of the preferred embodiment of the apparatus of the present invention.
Figure 2:
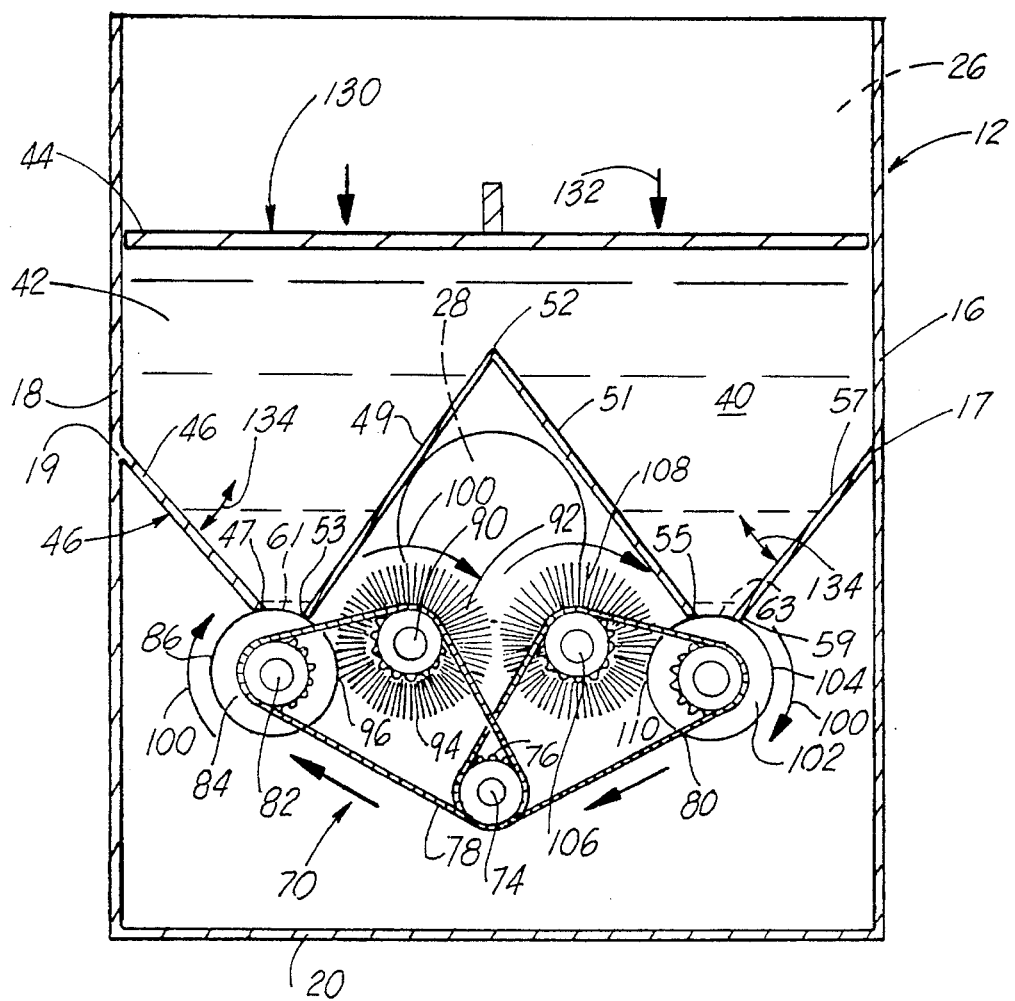
FIG. 2 is a cross sectional view of the preferred embodiment of the apparatus of the present invention.

2, apparatus 10 comprises a closed chamber 12, having a front wall 14, a pair of side walls 16, 18, a floor portion 20, a top portion 22, and a rear wall portion 24, for defining the closed chamber 12 therein. In the preferred embodiment, chamber 12 would be constructed of a metal or the like material and would define a fluid tight chamber space 26 therein as illustrated in FIG. 2. Further, as illustrated in FIGS. 1 and 2, there is seen a bore 28 extending through both the front wall 14 and rear wall 24 of the chamber, for allowing a threaded member 120, such as a large industrial bolt, to be inserted therethrough as will be explained further. As further illustrated in FIGS. 1 and 2, there is included a secondary housing 30, which has a front metal plate 32, and a sidewall 33, which defines the housing 30 which houses the drive mechanism that will be more fully described in FIG. 3. There is further illustrated in FIG. 1, a hydraulic line 34 extending into a motor 36 which drives the drive mechanism as again will be described more fully in FIG. 3.

Turning now to FIG. 2, there is illustrated in side cut away view the chamber 12 again illustrating the side walls 16, 18, and the floor portion 20. As illustrated in partial cut away view, chamber 12 includes a primary chamber space 40, which would be filled with a fluid lubricant 42 up to an upper level 44 as illustrated in FIG. 2. Lubricant 42 would be a rather viscous lubricant, of the type used for coating the surfaces of metal items such as threaded bolts. As illustrated, the lower portion of fluid chamber 40 includes a plurality of angulated base members, which comprises a first member 46, extending inclined downwardly from point 19 of side wall 18, and terminating in an edge 47, as illustrated. There is further provided a pair of downward depending central base members 49, 51, which extend from a common apex 52 within chamber space 40, and again terminate at edges 53, 55, respectively with base members 49, 51 extending across the width of chamber 40 and held in place against the front wall 14 and rear wall 24. Further, there is a fourth base member 57, which as does plate 46, extend from a point 17 along wall 16, and extends downwardly which terminates in a point 59. The downward depending plate members 46, 49, 51 and 57, define for the most part the base of the fluid chamber 40. As seen in FIG. 2, plates 51, 57 and plates 46, 49, define two funnel shaped passageways 50, 54, which allows the lubricant 42 to be directed downward. Further, as seen in FIG. 2, there is defined a first space 61 between the terminating edge 47 and the terminating edge 53 of plates 46 and plate 49 respectively. Likewise, there is a second space 63, defined by the terminating end 59 of member 57 and the terminating end 55 of member 51 respectively. The spaces 61, 63 would define a means for allowing the fluid 42 contained within 40 to make contact with the lubricating means 70 as will be described further.

Figure 4:
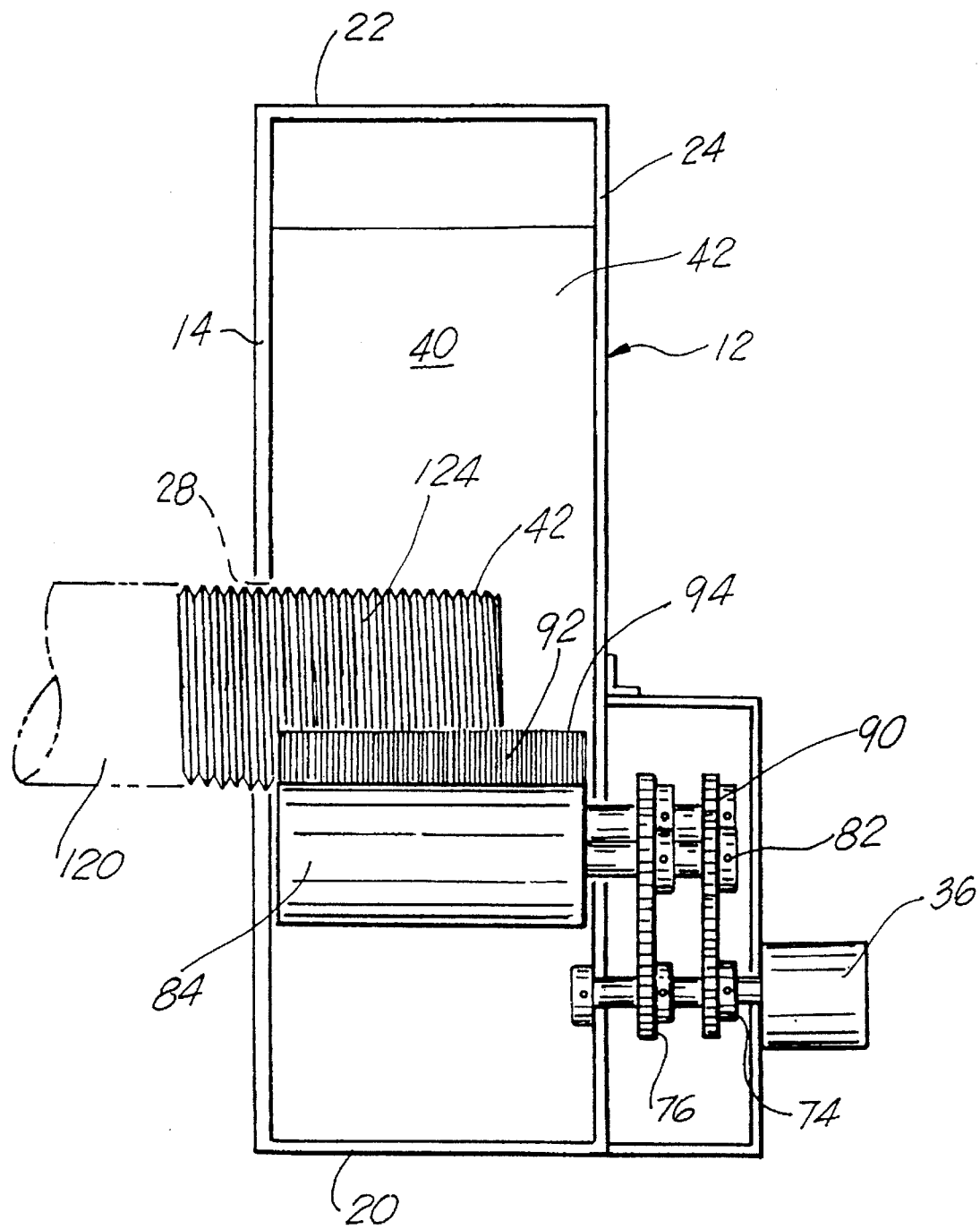
FIG. 4 is an isolated view of that portion of the apparatus of the present invention illustrating the relationship between the roller, brush and threaded bolt.

As seen further in FIG. 2 and in partial view in FIG. 4, this lubricating means 70 includes a motor 36, having a double drive sprocket 74 having teeth 76 for engaging a first drive chain 78 and a second drive chain 80. First drive chain 78 would engage a sprocket 82 which would drive a first lubricating roller 84, which would be again mounted to the front and rear wall portions 14, 24 of chamber 12, and would rotate freely when driven by chain 78. The drive roller 84 would have a continuous smooth surface 86, the surface of which when driven by chain 78, would make contact with the lubricant 42 within space 61. Lubricant 42 would be spread onto the surface 86 of roller 84 as it is rotated by drive chain 78. Further, drive chain 78 would continue to drive a second drive sprocket 90 which would in turn drive a bristled brush 92. Brush 92 likewise would be mounted on the rear and forward wall portions 14, 24 of chamber 12, and would likewise be rotated by drive chain 78. The ends 94 of the bristles 93 of brush 92 would make contact at point 96 with the outer surface 86 of roller 84, and lubricant 42, which has been spread upon the surface 86 of roller 84, would then be transferred at point 96 to the ends 94 of bristles 93 as the roller 84 and brush 92 are rotated by motor drive sprocket 74. You can see that each of the chains 78 would drive the roller 84 and brush 92 in the direction of arrows 100 as illustrated in FIG. 2.

There is further illustrated in FIG. 2, a second roller 102 which would be identical in construction to roller 84, which would again have an outer surface 104 which would collect a layer of lubricant 42 at space 63 along the outer surface 104 of roller 102 as the roller 102 is rotated by second drive chain 80. Likewise, drive chain 80 would in turn engage a drive sprocket 106 of brush 108 for rotating same. Brush 108 would make contact at point 110 with the lubricant 42 on the outer surface 104 of roller 102 and would transfer the lubricant onto the bristles 109 of brush 108. Again, the brush 108 and roller 102 would be turned in the direction of arrows 100 as illustrated in FIG. 3.

Figure 3:
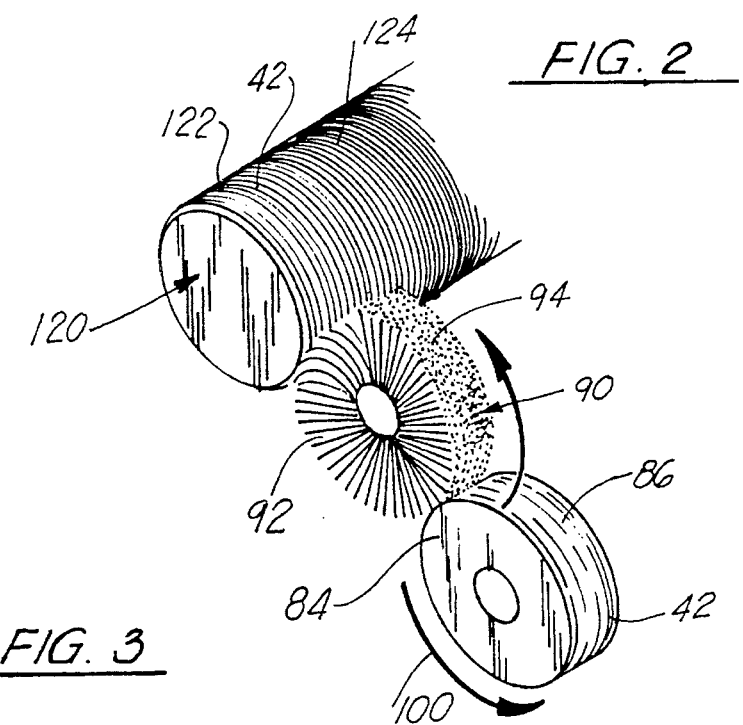
FIG. 3 is a cut away view of the preferred embodiment of the apparatus of the present invention.

As seen further in FIGS. 2 and 3, the bore 28 is positioned below the downward depending base members 46, 49, 51 and 57, so that, of course, lubricant 42 can make contact only with rollers 84, 102 through the spaces 61, 63 as seen in FIG. 3. This bore 28 would accommodate a bolt member 120 as seen in FIG. 3 in partial view. As seen in the FIGURE, a bolt member 120 having a threaded stud portion 122 via threads 124, would be inserted into the bore 28 of chamber 12, as seen in FIGS. 2 and 4. There is further illustrated in FIG. 4 a partial view of one roller, for example, roller 84, wherein the outer surface 86 has been coated with the lubricant 42 in the manner as was described earlier. As the roller is rotated in the direction of arrow 100, the roller makes contact with the end portion 94 of the bristles 93 of the brush member 90, and the lubricant 42 is then spread onto the threaded portion 122, of stud member 120 as seen in FIG. 3. Through this manner of transferring the lubricant from the outer surface 86 of roller 84, and coating it onto the ends 94 of brush 90, there is a thin even layer of lubricant 42 coated onto a portion of threaded portion of bolt 120 as the stud portion 122 of bolt 120 is inserted into bore 28. In the preferred embodiment, when bolt 120 is inserted into bore 28, and the rollers are rotating with the lubricant thereon, the bolt member 120 is manually rotated by a person, so that the lubricant is spread evenly around the outer surface of the stud and then the bolt is manually retrieved from bore 28 and a subsequent bolt 120 is inserted therein. As is clear from FIG. 2, there is a sufficient quantity of lubricant 42 contained within the chamber 12, so that a great number of bolts 120 can be coated with a thin even layer of lubricant 42 during this process without having to manually undertake any pulling as is currently done in the art.

As further illustrated in FIG. 2, a plate member 130 is positioned on the upper surface 44 of lubricant 42. Plate member 130 would simply be a means for exerting a downward force, arrow 132, on the lubricant 42 in order to insure that the lubricant 42 is moving into spaces 61, 63, during the operation of the apparatus. When lubricant 42 must be placed in the chamber 12, plate member 130 is simply removed from the chamber and additional lubricant is added.

An additional feature of the apparatus is the fact that in the preferred embodiment, downward depending plates 46, 57 may be adjustable in the direction of arrows 132 via a manual adjustment means 134, as for example, an adjustable screw making contact with each plate 46, 57. This adjustment of the plates 46, 57 would enable that the ends 47, 59, respectively of each of the plate members 46, 57 would form a variable gap between the surface of the rollers 84, 102, so that additional lubricant may be allowed to be coated onto the surface if that were necessary, or in the event that a greater amount of lubricant is being spread onto the surface of the rollers and likewise onto the surface of the bolt, then the space between the ends 47, 59, of plates 46, 57 could be allowed to reduce the gap between the rollers 84, 102 and therefore less lubricant 42 would be coated onto the surface of rollers 84, 102 and transferred onto the brushes and ultimately onto the stud 122 of bolt 120.

The following table lists the part numbers and part descriptions as used herein and in the drawings attached hereto.

| PARTS LIST | |
|---|---|
| Description | Part No. |
| apparatus | 10 |
| closed chamber | 12 |
| front wall | 14 |
| side walls | 16, 18 |
| points | 17, 19 |
| floor portion | 20 |
| top portion | 22 |
| rear wall portion | 24 |
| chamber space | 26 |
| bore | 28 |
| secondary housing | 30 |
| front metal plate | 32 |
| side wall | 33 |
| hydraulic line | 34 |
| motor | 36 |
| primary chamber space | 40 |
| fluid lubricant | 42 |
| upper level | 44 |
| first member | 46 |
| edge | 47 |
| central base members | 49, 51 |
| passage ways | 50, 54 |
| apex | 52 |
| edges | 53, 55 |
| base member | 57 |
| point | 59 |
| first space | 61 |
| second space | 63 |
| lubricating means | 70 |
| double drive sprocket | 74 |
| teeth | 76 |
| first drive chain | 78 |
| second drive chain | 80 |
| sprocket | 82 |
| first lubricating roller | 84 |
| smooth surface | 86 |
| second drive sprocket | 90 |
| bristle brush | 92 |
| bristles | 93 |
| ends | 94 |
| point | 96 |
| arrow | 100 |
| second roller | 102 |
| outer surface | 104 |
| brush | 108 |
| bristles | 109 |
| point | 110 |
| threaded bolt member | 120 |
| stud portion | 122 |
| threads | 124 |
| plate member | 130 |
| arrow | 132 |
| adjustment means | 134 |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for lubricating threads of threaded members, comprising:
   a) a chamber for housing lubricant;
   b) a first roller for receiving lubricant from the chamber onto an outer surface of the roller;
   c) a brush member, making sufficient contact with the outer surface of the roller to receive lubricant onto bristles of the brush member;
   d) power means for rotating the first roller and the brush member so that the lubricant can be transmitted from the outer surface of the roller to the bristles of the brush member;
   d) means for allowing a threaded member to be positioned sufficiently adjacent the brush member for receiving a thin layer of lubricant from the bristles of the brush member onto a portion of the outer threaded portion of the threaded member as the brush member is rotated.

2. The apparatus in claim 1, wherein the power means rotates a second roller receiving lubricant from the chamber, and transferring the lubricant to a second brush member, then onto the surface of the threaded member, as the threaded member is positioned adjacent the first and second brush members.

3. The apparatus in claim 1, wherein the chamber housing the lubricant further comprises an opening in its lower portion for administering lubricant evenly over the surface of the threaded member.

4. The apparatus in claim 1, further comprising a weighted member positioned on the upper surface of the lubricant for exerting downward force on the lubricant to assist the lubricant's flow out of the chamber.

5. The apparatus in claim 1, further comprising adjustment means for adjusting an opening through which the lubricant flows from the chamber onto the surface of the first roller.

6. The apparatus in claim 1, wherein the power means comprises a motor engaged to the first roller and brush member with a continuous drive chain.

7. The apparatus in claim 1, wherein the means for allowing a threaded member to be placed adjacent the brush member comprises a circular opening in the wall of the apparatus, so that when the threaded member is positioned into the circular opening, the brush bristles containing the lubricant make contact with the threaded member for administering lubricant thereupon.

8. An apparatus for lubricating threads of threaded members, comprising:
   a) a chamber for housing lubricant;
   b) a first roller for receiving lubricant from the chamber onto an outer surface of the roller;
   c) a first brush member, making sufficient contact with the outer surface of the first roller to receive lubricant onto bristles of the brush member;
   d) a second roller for receiving lubricant from the chamber onto an outer surface of the second roller;
   e) a second brush member, making sufficient contact with the outer surface of the second roller to receive lubricant onto bristles of the second brush member;
   f) power means for rotating the first and second rollers and the first and second brush members so that the lubricant can be transmitted from the outer surface of the first and second rollers to the bristles of the first and second brush members;

g) means for allowing a threaded member to be positioned sufficiently adjacent the bristles of the first and second brush members for receiving lubricant from said bristles onto a portion of the outer threaded portion of the threaded member as the brush members are rotated.

9. The apparatus in claim 8, wherein the chamber housing the lubricant further comprises an opening in its lower portion for administering lubricant evenly over the surface of the first and second rollers.

10. The apparatus in claim 8, further comprising a weighted member positioned on the upper surface of the lubricant for exerting downward force on the lubricant to assist the lubricant's flow out of the chamber.

11. The apparatus in claim 8, further comprising adjustment means for adjusting an opening through which the lubricant flows from the chamber onto the surfaces of the first and second rollers.

12. The apparatus in claim 8, wherein the power means comprises a motor engaged to the first roller and first brush member with a first continuous drive chain, and engaged to the second roller and second brush member with a second continuous drive chain, the first and second rollers and brushes driven in unison by the power means.

13. The apparatus in claim 8, wherein the means for allowing a threaded member to be placed adjacent the first and second brush members comprises a circular opening in the wall of the apparatus, so that when the threaded member is positioned into the circular opening and manually rotated, the brush bristles of the first and second brush members containing the lubricant make contact with the threaded member for administering lubricant thereupon.

14. An apparatus for lubricating threads of threaded members, comprising:

a) a chamber for housing lubricant;

b) a first roller for receiving lubricant from the chamber onto an outer surface of the roller;

c) a first brush member, making sufficient contact with the outer surface of the first roller to receive lubricant onto bristles of the brush member;

d) a second roller for receiving lubricant from the chamber onto an outer surface of the second roller;

e) a second brush member, making sufficient contact with the outer surface of the second roller to receive lubricant onto bristles of the second brush member;

f) power-driven drive chains engaging and rotating the first and second rollers and the first and second brush members so that the lubricant can be transmitted from the outer surface of the first and second rollers to the bristles of the first and second brush members as the rollers and brushes are rotated;

g) a circular opening in the wall of the apparatus for allowing a threaded member to be positioned sufficiently adjacent the bristles of the first and second brush members for receiving lubricant from said bristles onto a portion of the outer threaded portion of the threaded member as the threaded member is manually rotated, and the rollers and brush members are rotated by the drive chains.

15. The apparatus in claim 14, further comprising adjustable plate members on the floor of the chamber housing the lubricant for regulating the amount of lubricant flowing onto the surfaces of the first and second roller members as an opening to the rollers is adjusted so that a thin, even layer of lubricant is transferred to the bolt by the brush members.

16. The apparatus in claim 1, wherein the threaded member comprises a bolt which is slowly rotated within an orifice as the brush member lubricates the threads of the threaded member.

17. The apparatus in claims 8 or 14, wherein the threaded member comprises a bolt which is slowly rotated within an orifice as the brush members lubricate the threads of the threaded member.

* * * * *